UNITED STATES PATENT OFFICE.

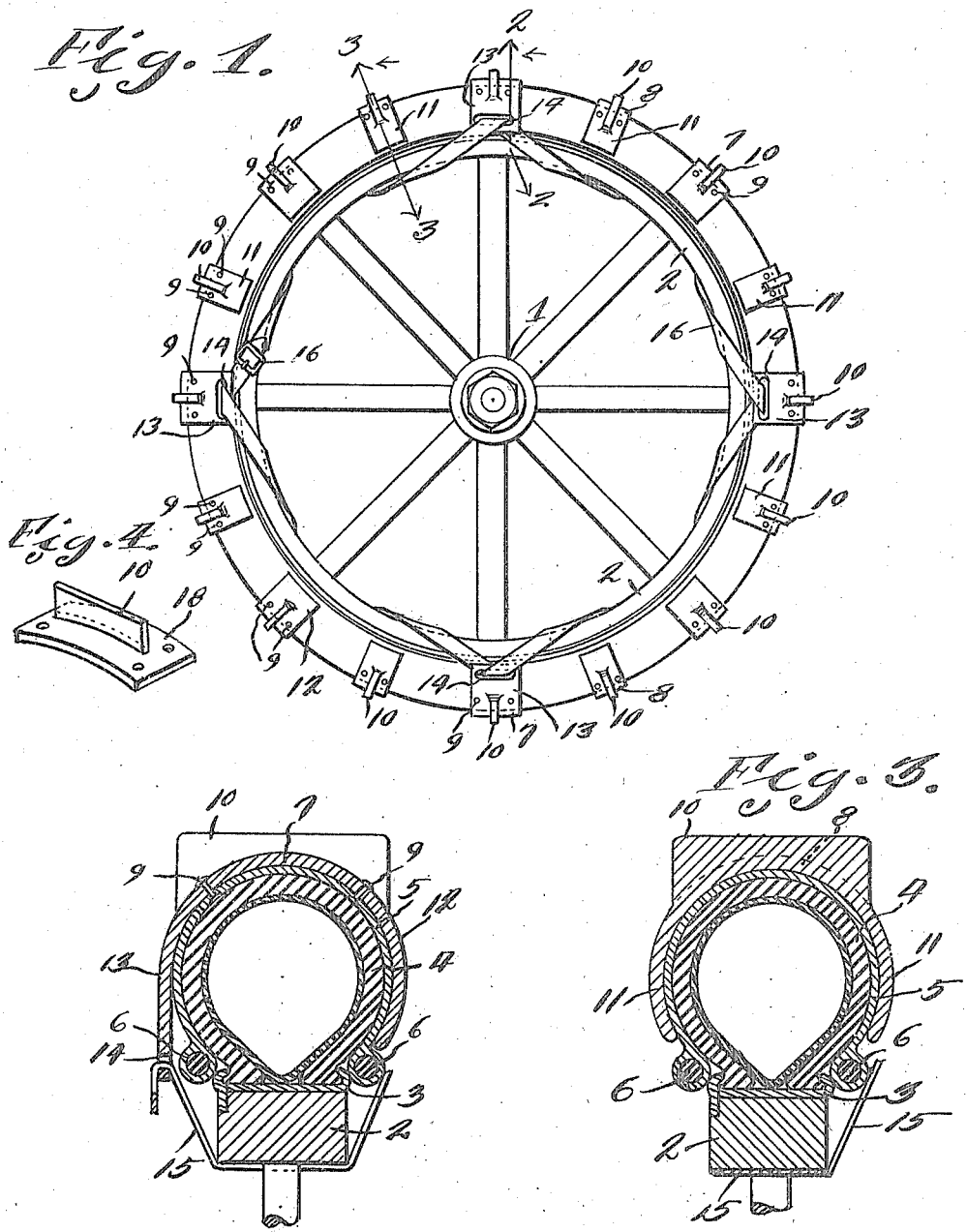

GOLDMAN L. McCONNELL, OF WEST LEBANON, INDIANA.

NON-SKID TIRE-PROTECTOR.

1,264,830. Specification of Letters Patent. Patented Apr. 30, 1918.

Application filed March 29, 1917. Serial No. 158,365.

*To all whom it may concern:*

Be it known that I, GOLDMAN L. McCON-NELL, a citizen of the United States, residing at West Lebanon, in the county of Warren, State of Indiana, have invented a new and useful Non-Skid Tire-Protector; and I do hereby declare the following to be a full, clear, and exact description of the invention, such as will enable others skilled in the art to which it appertains to make and use the same.

The invention relates to traction devices and tire protectors adapted to form part of a motor-vehicle equipment and seeks to provide, as one of its objects an exterior casing for the tire having anti-slipping devices affixed thereon.

A further object is to so construct the anti-slipping devices that they may be enabled to assist in securing the outer casing for the tire.

A still further object is to provide a single strap, whereby the outer casing may be secured to the tire.

Other objects will appear in the detailed description of the invention which follows.

The same numerals of reference designate the same parts in all of the several figures of the drawings, wherein:

Figure 1 is a side elevation of an automobile wheel, showing the invention attached thereto.

Fig. 2 is a section on the line 2—2 of Fig. 1.

Fig. 3 is a section on the line 3—3 of Fig. 1.

Fig. 4 is a detailed perspective, showing a modified form of the anti-slipping device.

In the drawings, 1 represents an automobile wheel having the felly 2 and the tire rim 3 to which is attached the tire 4. The outer casing 5 is designed to cover the tire and to completely inclose the latter up to the rim 3. This outer casing is preferably constructed of heavy canvas cut on the bias and has elastic bands 6 inclosed at its edges, so that the casing will be drawn close around the tire when placed upon the latter.

Uniformly spaced around the casing 5 and suitably affixed thereto by rivets 9 are curved plates 7 and 8. Plates 7 and 8 are of different widths, the narrow plates 8 alternating with the wide plates 7 in their positions on the casing 5.

Transverse friction plates 10 are made integral parts of the plates 7 and 8 and serve to provide a firm grip on the ground when the invention is applied to an automobile tire.

The extensions 11 of the plates 8 are adapted to surround the casing 5, terminating close to the elastic bands 6. These extensions are designed to be resilient, so as to be sprung laterally, whereby the casing 5 may be more easily removed from the tire 4.

The plates 7 are provided with a resilient extension 12 similar to the extension 11 of the plates 8. The plates 7 are also provided with extensions 13 which have elongated transverse eyes 14 formed therein. In attaching to the casing 5, the plates 7 are divided into two sets, those of one set alternating with those of the other set. One set is so arranged as to bring all of the extensions 13 on one side of the casing 5, while the other set is positioned to bring the extensions 13 on the opposite side of the casing. The belt 15 then passes through one eye 14, (which is adjacent the felly 2) through the eye 14 of the next succeeding and oppositely disposed extension 13, then back adjacent the inner circumference of the felly and through the eye of the next succeeding extension and so on, terminating near the eye which was first engaged where it engages the buckle 16 attached to its other end. The extensions 13 containing the eyes are designed to have the same amount of resiliency as the extensions 12 to permit them to yield when the strap 15 is being attached.

In place of the plates 7 and 8, plates 18, substantially identical with the plate shown in Fig. 4, may be used.

The invention is very useful when traveling in the country where muddy roads may be traversed and steep grades encountered, since smooth tires will not always engage a slippery road surface. The friction plates 10 insure a positive engagement with such a slippery surface and relieve the engine of the undue strains ordinarily imposed upon it by the intermittent slipping and gripping of the driving wheel. Further, the outer casing 5 acts as a protecting armor for the tire, thereby preventing undue wear on the tire.

What is claimed is:

In combination, a canvas shield engaging substantially about a wheel tire, a plurality of non-skid plates curved in cross section to conform to the tire and the shield thereon and riveted to the shield, said plates having spring end portions, and one end of each plate having a slot, every other plate having its slotted end on the side of the tire, opposite the slot of an adjacent plate, and a flexible member passed back and forth across the rim of the wheel and through the slots of said several plates, whereby they are secured together with the covering in place on the wheel.

In testimony whereof I have signed my name to this specification in the presence of two subscribing witnesses.

GOLDMAN L. McCONNELL.

Witnesses:
F. O. KELLY,
ROBERT E. McCONNELL.